United States Patent [19]

Wortley

[11] Patent Number: 4,625,897

[45] Date of Patent: Dec. 2, 1986

[54] METERING DISPENSERS

[75] Inventor: Michael Wortley, Portsmouth, England

[73] Assignee: Sunbeam Plastics Corporation, Evansville, Ind.

[21] Appl. No.: 652,904

[22] Filed: Sep. 21, 1984

[51] Int. Cl.$^4$ ............................................. G01F 11/26
[52] U.S. Cl. .................................... 222/205; 222/207; 222/478
[58] Field of Search ............... 222/205, 207, 567, 569, 222/570, 424.5, 442, 478

[56] References Cited

U.S. PATENT DOCUMENTS

| | | | |
|---|---|---|---|
| 2,599,446 | 6/1952 | Green | 222/205 |
| 2,730,270 | 1/1956 | Heinemann | 222/205 |
| 3,246,807 | 4/1966 | Micalleff | 222/207 |
| 3,705,668 | 12/1972 | Schwartzmann | 222/207 |
| 3,739,955 | 6/1973 | Gores | 222/205 X |
| 4,138,040 | 2/1979 | Stock | 222/569 X |
| 4,143,797 | 3/1979 | Reed | 222/207 |
| 4,474,312 | 10/1984 | Donoghue | 222/205 |

FOREIGN PATENT DOCUMENTS 7613833 6/1978 Netherlands ............... 222/205
2067517 7/1981 United Kingdom .

Primary Examiner—Joseph J. Rolla
Assistant Examiner—Frederick R. Handren
Attorney, Agent, or Firm—Irvin L. Groh

[57] ABSTRACT

A metering dispenser assembly comprises a squeeze bottle 1 with a metering cup 3 fitting in the neck of the bottle and carrying a dip tube 9 which extends to the bottom of the bottle. The dip tube, or at least a pillar 7 into which it fits, terminates at a level between the top and bottom of the cup, and there is a vent hole at this level to provide communication between the container and atmosphere. The vent is small enough not to allow significant leakage from the cup during a dispensing operation. The vent could instead be alongside the dip tube.

7 Claims, 4 Drawing Figures

METERING DISPENSERS

This invention relates to a simple form of dispenser for enabling a user to measure out a predetermined quantity of liquid product. There is a need for such a dispenser in various horticultural and domestic situations, for example in adding a liquid detergent to a washing machine or a dishwasher, in diluting measured quantities of concentrated weedkiller or fertiliser or in dispensing liquid disinfectants or foodstuffs or medicines by the spoonful. Pouring from a bottle into a spoon or a small measuring cup is troublesome, inaccurate and often leads to spillage. Commercial measuring devices such as liquid soap dispensers or optics used in bars are expensive and complex.

It has been proposed to provide a squeeze bottle with a measuring cup in its upper region, for example in British Patent Specification No. 2 067 517.

According to the invention we provided a metering dispensing container assembly comprising a hand-held squeezable container and an upwardly open cup mounted in a sealing manner in the neck of the container, the cup having extending through its bottom wall a dip tube assembly extending substantially to the bottom of the interior of the container, the upper end of the dip tube assembly being open to atmosphere at a point above the bottom of the cup but below the level of the open top of the cup, and the cup having an air vent providing communication, at least when the cup is empty, between the interior of the container and atmosphere.

With the bottle held upright, the user squeezes the bottle to force its liquid contents up the dip tube to fill the cup. He stops squeezing before the liquid overflows the cup and then when he relaxes his grip the liquid level in the cup falls, the liquid flowing back into the bottle through the dip tube, until the open upper end of the dip tube is uncovered. The suck-back then ceases and the user is left with a known quantity of liquid in the cup, which he can then pour out.

Preferably, where the dispenser is intended for non-viscous, e.g. water-based, products the top of the dip tube is not open upwards, as a vigorous squeeze on the bottle would produce a jet of liquid; instead its top end is partially closed by a baffle or plug which directs the liquid flow laterally into the cup upon squeezing. Where the product is viscous, e.g. a syrup, the plug can be omitted.

The venting means in a preferred embodiment is constituted by an aperture in the wall of the cup, and serves to prevent the inadvertent build-up pressure in the bottle which may result in liquid being forced up the tube when the closure cap is removed. An alternative form of venting means could comprise a clearance between the dip tube and its mounting in the cup.

The invention will now be further described, by way of example only, with reference to the accompanying drawings, of which:

Figure 1:
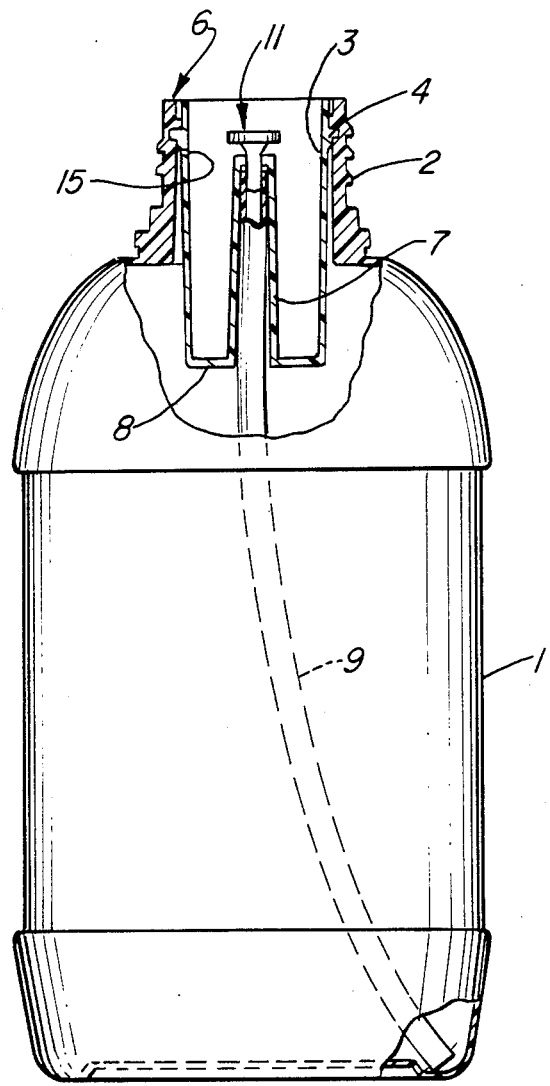
FIG. 1 is a vertical section through a squeeze bottle fitted within a dispensing device according to the invention.
Figure 2:
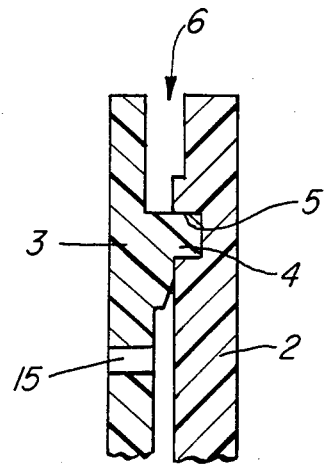
FIG. 2 is a vertical section on an enlarged scale of part of the dispensing device shown in FIG. 1.

FIG. 1 shows a bottle 1 made of blower plastics and sufficiently pliable to be squeezed in a user's hand in a known manner, having a cylindrical neck 2 in which a substantially cylindrical pot-shaped cup 3 is a tight fit. The cup has a bead 4 of rectangular section to define its position in relation to the neck, fitting with a snap engagement into an annular recess or groove 5 in the inner wall of the neck 2. It will be noted from FIG. 2 that there is a substantially clearance between the upper end of the cup 3 and the surrounding part of the neck 2 above the level of the bead 4 to define an annular gap 6. This gap provides clearance for a downwardly projecting sealing lip or flange on a closure cap (not shown) fitted onto the neck 2, and it means that existing caps and bottles do not have to be modified to adapted them to incorporate the metering arrangements according to the invention.

Alternatively, the cup could have an outwardly directed flange at its upper end, instead of the bead 4, but this would lose the above-mentioned advantage.

A hollow pillar 7 upstanding from the base 8 of the cup 3 and moulded integrally with it receives frictionally the upper end of a dip tube 9, the top of which engages an inturned lip 10 on the upper end of the pillar. The lower end of the dip tube extends down to the bottom of the bottle 1 and the tube is curved so that the end is in a corner rather than the middle of the bottom.

The height of the pillar 7 is such that its upper end is about three-quarters of the way up the cap 1 in the example shown. It will be appreciated that the height of the pillar (or of the upper end of the dip tube itself if there is no pillar) will determine the volume of liquid which is measured out by the cup. Using the same basic moulding tools but different core pins for forming the pillar it is possible to mould a range of cups of the same outside dimensions but different measured dosages, up to around 90% of the volume of the cup.

Figure 3:
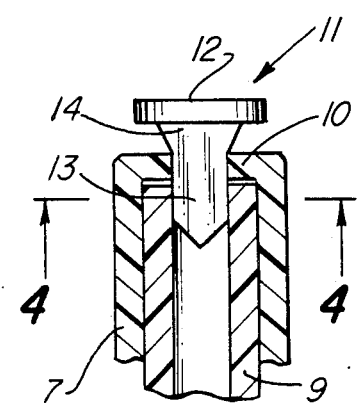
FIG. 3 is a vertical section on an enlarged scale of a further part of the dispensing device shown in FIG. 1.
Figure 4:
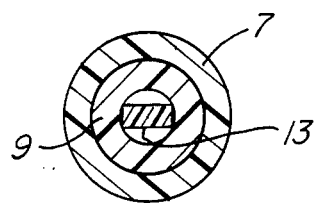
FIG. 4 is a transverse section on line IV—IV of FIG. 3.

There is a baffle or plug 11 fitting in the upper end of the pillar 7, or directly in the upper end of the tube 9 to prevent liquid being sprayed upwards in a jet if the bottle is squeezed with excessive force. It comprises a top plate 12 and a flat tongue 13 joined by a tapering portion 14 (see FIGS. 3 and 4). The tongue enters the tube 9 but its entry is limited by the portion 14, so that liquid can pass up the tube, past the tongue, but is then deflected laterally by the top plate 12. Where the dispenser is to be used only with viscous fluids the plug can be omitted.

Assuming the bottle contains a liquid to be dispensed in measured quantities, the user squeezes the bottle 1 to force liquid up the dip tube 9, past the plug 11 and into the cup 3. He stop squeezing before the cup overflows but only after the plug 11 is covered. Surplus liquid flows back down the dip tube until the level is that of the lip 10, and further flow ceases. Thus the cup then contains a known quantity of liquid. The user pours his quantity out. No liquid, or at least no significant amount, flows from the bottle itself as the bottle end of the dip tube 9 usually comes above the surface of the liquid when the bottle is tilted well beyond the horizontal to pour out the contents of the cup.

Venting means is provided in the form of an aperture 15 in the wall of the cup 3 to vent the air space within the bottle to atmospheric pressure to avoid inadvertent build-up of pressure in the bottle 1. This prevents the liquid being forced up the tube 9 on removal of the cap, for example, in the event of high temperatures arising in storage or transit. The vent is made as small as possible in cross-section, since it only has to cope with relatively low pressure differentials and it is preferably small enough not to allow any significant quantity of liquid in the cup to drain back into the container during the measuring and dispensing step if the pillar 7 is so high as to bring the measuring level near or above the vent.

An alternative way of venting is to provide some clearance, for example a groove, on the inside of the pillar, between the pillar and the dip tube.

In a modification the pillar 7 could be omitted, the dip tube simply projecting upwards the required distance through a hole in the bottom of the cup. In a further modification the pillar could be present, as well as a coaxial downwardly projecting spigot, over which the end of the dip tube fits.

It will be seen that we have provided a very simple and cheap way of dispensing pre-determined quantities of liquid, suitable for mass production and low enough in cost to fit to one-trip bottles; it is easy to fit, easy to clean, and can readily be adapted to different dosage requirements. The cup can readily be fitted in any standard bottle which can be adapted simply by provision of the annular recess 5. In addition, the provision of the clearance 6 in the assembled dispenser ensures the proper sealing fit of any cap incorporating an inner depending lip or skirt. Also it offers a degree of child-resistance, since its manner of use is not readily apparent to a small child.

I claim:

1. A metering dispensing container assembly comprising a hand-held squeezable container and an upwardly open cup mounted in and having its side wall sealed to the neck of the container, the cup having extending through its bottom wall a dip tube assembly extending substantially to the bottom of the interior of the container, the upper end of the dip tube assembly being open to atmosphere at a point above the bottom of the cup but below the level of the open top of the cup, and the cup having an air vent in its side wall below the seal to the container neck providing communication, between the interior of the container and atmosphere.

2. A metering dispensing container assembly according to claim 1 in which the air vent is below the level at which the upper end of the dip tube assembly is open to atmosphere, but small enough not to allow a significant quantity of liquid to flow back from the cup to the container during a dispensing operation.

3. A metering dispensing container assembly according to claim 1 in which the cup is retained in the neck of the container by an annular bead on the outside of the cup having a snap engagement with an annular groove in the inside of the neck.

4. A metering dispensing container assembly according to claim 1 in which the upper end of the cup is spaced inwards from the inside of the neck to leave an upwardly open annular gap capable of receiving a downwardly projecting sealing lip on the inside of a closure cap fitted over the neck.

5. A metering dispensing container assembly according to claim 1 in which the upper end of dip tube is received in a hollow pillar upstanding from the base of the cup.

6. A metering dispensing container assembly according to claim 1 in which, in the region where the upper end of the dip tube is open to atmosphere, there is a deflecting baffle engaging the upper end of the dip tube or of the pillar, where present, and acting to deflect laterally any upward flow of liquid from the dip tube.

7. A metering dispensing container assembly according to claim 6 in which the baffle comprises a laterally extending top portion with a downwardly extending non-circular tongue portion engaging in the top end of the pillar or dip tube to be held frictionally but allowing upward flow of liquid past the tongue portion.

* * * * *